United States Patent [19]

Grundy

[11] Patent Number: 4,794,625

[45] Date of Patent: Dec. 27, 1988

[54] METHOD AND APPARATUS FOR CONTOLLING TEMPERATURE IN A FIBER GLASS FORMING BUSHING

[75] Inventor: Reed H. Grundy, Murrysville, Pa.

[73] Assignee: PPG Industries, Inc., Pittsburgh, Pa.

[21] Appl. No.: 149,330

[22] Filed: Jan. 28, 1988

[51] Int. Cl.[4] .............................. C03B 5/26; C03B 7/22
[52] U.S. Cl. ........................................................ 373/28
[58] Field of Search .................. 373/28, 27, 39, 40, 373/108, 135, 136; 65/1

[56] References Cited

U.S. PATENT DOCUMENTS

| | | | |
|---|---|---|---|
| 4,024,336 | 5/1977 | Jensen | 373/28 |
| 4,262,158 | 4/1981 | Lynch | 373/28 |
| 4,657,572 | 4/1987 | Desai et al. | 373/28 |

Primary Examiner—Roy N. Envall, Jr.
Attorney, Agent, or Firm—John E. Curley

[57] ABSTRACT

A control system for a fiber glass forming bushing is described in which two thermocouple circuits are connected to a transformer having two sets of windings on a common core in series aiding configuration. A third thermocouple circuit is connected to the transformer. This configuration measures bushing temperatures, weight averages the signals representing those temperatures, and feeds a signal to a temperature controller for the bushing. The interposed transformer prevents the improper operation of the controller and possible damage to the bushing.

4 Claims, 3 Drawing Sheets

METHOD AND APPARATUS FOR CONTOLLING TEMPERATURE IN A FIBER GLASS FORMING BUSHING

The present invention involves a method and apparatus for controlling the temperature of a fiber glass bushing through an electrical temperature controller responsive to thermocouple generated signals. More particularly, the present invention relates to methods and apparatus for controlling fiber glass bushings involving a weighting scheme for thermocouple measurements taken therein to generate signals for feed to an electrical control system for such bushings. Still more particularly the present invention relates to a bushing control system which accurately measures and controls fiber glass leaching temperatures while protecting the control system from deleterious effects of common mode signals.

BACKGROUND OF THE INVENTION

It is common practice in the fiber glass industry today to control the bushings in which molten glass is contained and through which glass fiber formation occurs and to control the bushing which is essentially a heating element by utilizing electrical control devices. Thus, in U.S. Pat. Nos. 4,546,485 and 4,594,087, two systems are described which generally speaking conform to systems currently in use today for producing fiber glass from fiber glass bushings.

In the formation of glass fibers from a bushing, the bushing goes through an operational cycle which involves starting up the bushing, running the bushing, doffing the product wound from the bushing and restarting the bushing. What this means in real terms is that the bushing is subjected to many changes in its thermal history over each running cycle.

A bushing for producing glass fibers is typically constructed of non-reactive refractory metal such as platinum, platinum-rhodium alloy being the preferred metal. The bottom of the bushing is typically divided into a plurality of rows of orifices through which molten glass can readily flow. The orifices usually have on the bottom side of them an associated orifice tip in communication with the orifice so that the molten glass passing through the orifices flows through the tips. Fibers are formed as the molten glass flowing from the tips to the atmosphere is cooled. Fibers formed from the bushing are typically gathered into one or more strands and are attenuated by connecting the strand or strands to the surface of a rotating winder which rotates at sufficient revolutions per minute to pull the strands at linear speeds of 3,000 to 20,000 feet per minute or more.

In operating a glass fiber forming bushing, therefore, molten glass is permitted to flow by Poiseuille's Law through the orifices in the bottom of the bushing. The resulting streams of molten glass are cooled to form filaments as they leave the bushing bottom. Cooling is accomplished by water sprays and environmental air. The fibers or filaments are gathered into one or more strands, usually by placing the filaments as they emerge from the bushing tips into a grooved graphite gathering shoe. The resulting strand or strands are then wound around the surface of the winder and the winder is rotated. Thus the strands are drawn from the bushing by being wound on the winder as it begins to rotate. The winder increases in speed until it reaches the desired speed that will produce a filament of a given diameter based on the diameter of the orifices in the bushing through which the glass is drawn. Another parameter that controls the diameter of the filaments as they leave the orifices is the viscosity of the glass and that is determined by the temperature of the bushing and the glass composition. Since molten glass is continuously maintained in and passed through the bushing during fiber formation, the bushing is fed molten glass through an opening in a forehearth connected to a glass melting furnace.

In the starting up and stopping operation of a bushing, many transient effects occur. Thus, during start up, the initial strands wound on the winder surface are being wound at an accelerating speed which starts out from zero and gradually works its self up to the rotational speed necessary to produce a given filament size. This running of strand at high speed draws environmental air into the filament forming zone and then downwardly at considerable velocity. A bushing then runs for a significant period of time, usually 10 to 30 minutes or longer and the filaments being formed are wound in strand form on the surface of the winder at the desired filament diameter. When the desired weight of material has been accumulated on the surface of the winder the winder is then shut down. This shut down involves a deceleration of the rotation of the winder and a reduction in strand speed. Air flows around the bushing change rapidly as a result and the loss of cooling by the high velocity air present during running results in increased bushing temperatures if all things remain the same except the winder shut down.

As has been previously pointed out, the bushings are controlled by a temperature controller which feeds a signal corresponding to the desired set point for that bushing to the power pack that supplies the bushing current. Thus, for a given viscosity of glass desired from a bushing, it might require for example, a bushing temperature of 2200° F. In such an instance, it is desirable for that bushing to be forced to operate at 2200° F. so that the proper glass viscosity is maintained by the bushing. This, coupled with a control of the rotational speed of the winder through its motor controls accurately and efficiently the filament diameter.

To insure that the controller is operating a bushing at its desired temperature, thermocouples are placed in the sides of the bushing near the bottom. The readings from the thermocouples are then averaged and the resulting signal is sent to the power pack controller feeding current to the bushing. The thermocouples usually are located slightly inboard of the ends of the bushing and close to the bottom on the front wall, i.e., the wall closest to the operator. The thermocouple measurements taken are then passed through a temperature averaging device such as shown in U.S. Pat. No. 4,546,485 to determine the bushing bottom or faceplate temperature. As used herein, the terms faceplate, tip plate and bottom are synonymous. The signal resulting from this average temperature determination is then passed to the controller and the controller forces the bushing to adjust itself to the set point temperature based on the reading it obtains.

It has been found that while bushing controllers can to some degree control the bushing with a certain amount of accuracy, several serious defects are prevalent in this system. First, by taking bushing measurements from the sides of the bushings, close to the bottom at two locations, the effects of noise can be as high as 12% of the temperature signal read, therefore, the signal is inaccurate at least to that degree, i.e., only 88 percent of the signal represents true temperature. The other 12 percent measurad is caused by changing environmental effects and inappropriate thermocouple placement. It has also been found that during the start up, running and doffing of the forming packages that the temperature of the bushings varies over a very wide range and quite rapidly. Despite the accuracy of the thermocouples measuring the temperature of the tip plate, the signals that are generated thereby and fed to the controller contain false signals, i.e., noise. This is especially true when consideration is given to the strand which is an aggregate of the filaments. Thus, to control the yardage of the strand, the temperature of the entire array of tips must, therefore, be controlled. Thus, the effects of things such as environmental air changes occurring near the tip plate, movement of the strands from the gathering shoes to pull rolls during doffing, and other similar occurrences cause rapid temperature changes and gradients which give rise to tip plate measurements that are not a true indication of the thermal condition of the tip plate. While the controller tries to keep the temperature of the bushing constant based on the thermocouple readings, it has been found that these signals are not always representative of the tip plate temperature and therefore, a need for more accurate determination exists.

Still further, situations can arise where a temperature measuring connection to the bushing can become disengaged. When this occurs, the dynamic range of the controller's amplifier is exceeded and a runaway condition can result unless automatic limits on the control system are in place. A runaway could result in temperatures exceeding the softening temperature of the metal used in the leaching in such an instance. In another situation adjustments to fin coolers used to cool the glass streams issuing from bushing tips by an operation can cause a short which, depending on the location of the grounding, can cause common mode signals which, if not impeded, can cause the bushing controller to automatically adjust excessive current flows to the bushing.

The instant invention involves methods and apparatus which substantially reduces the effects of these problems or eliminates them altogether.

SUMMARY OF THE INVENTION

In accordance with the instant invention, the control system of a bushing which is being fed by signals from bushing measuring circuits is protected from any possible runaway situation caused by failure in any measuring circuit during operation. The protection is provided by feeding the bushing temperature measuring circuits through preferably, a transformer. The transformer is constructed and arranged in such a manner that it provides high impedance to common mode signals and low impedance to differential mode signals. The outuut signal from the transformer to the controller represents, in addition, the average temperature of the bushings measured by the input signals fed thereto by utilizing appropriate resistors in each of the circuits in accordance with the practices known to those skilled in the art to average the signals and thus, the temperature that they represent.

In the preferred embodiment of the invention the transformer consists of two identical center tapped windings on a common core. The thermocouples used to measure the bushing temperature are connected to the arms of the center tapped windings, while the output that is fed to the controller is taken from the center taps. One center tap winding is common to both the positive outputs of the thermocouples while the opposite winding is common to the negative outputs. If desired, a third signal, the potential of which is halfway between the potential at the location of the first two thermocouples, can be connected through proper weighting resistors to the center taps.

In the circuit arrangement described above, the individual temperature signals are averaged in a weighted mode. The weighting, as will be apparent to the skilled artisan, is a function of the conductance located in each of the arms of the thermocouple circuit. The weighting for the thermocouples connected to the transformer windings is provided by the direct current resistance of these windings. Since the thermocouples connected to the windings are normally operated in a balanced condition, the winding resistances provide all the necessary conductance needed. When a third or center thermocouple temperature is used, as it is in the preferred mode of operation, the resistors in series with this device are chosen according to the direct current resistance of the transformer legs. In other words, if the resistance in series with the third leg is equal to the resistances of the transformer legs, then the equal weighted average of the three temperatures controls the output signal.

It will be appreciated by the skilled artisan that the voltage at the center taps is maintained at one-half the voltage difference between each of the thermocouple circuits through transformer action. Since all windings have an equal number of turns, in the preferred embodiment, the voltages at the center taps are equal and, therefore, the difference is zero. It is by the above means that the common mode alternating voltages are thereby reduced to zero. Any alternating voltages which are produced by the thermocouples that constitute a signal, which are differential mode, are in opposition to the connection and thereby are not "dropped" across the individual windings but are passed to the nodes formed by the center taps. Thus, any differential mode alternating current signal is passed unattenuated to the output nodes. Since the inductances have zero impedance to direct current, the same holds true for the direct current signal that corresponds to the average temperature at each thermocouple. Also, the direct current signal is responsive to the direct current resistance of the transformer windings which permits the weighting, by proper choice of circuit resistance, of the component parts of the signal that is then fed to the controller. The advantage this circuit has over the previous art is that if a thermocouple lead wire should open, except for the direct current component of the effected thermocouple, all the aforementioned voltages at that particular center tap are maintained by transformer action and the connection to the opposite thermocouple.

It can be appreciated that if the odd thermocouple 470 were to be connected to a potential other than the one midway between thermocouple 471 and thermocouple 472 that the turns ratio could be altered so that the tap reflects the same potential as the connection point of thermocouple 470.

It will also be appreciated that if one is willing to give up the transformer action that some improvement over the art can still be achieved by using separate inductors in place of the transformer. Improvements using the inductors arise out of the ratio of alternating current to direct current impedance change. Since the control signal is largely direct current or very low frequency the inductors act as low pass filters.

BRIEF DESCRIPTION OF THE DRAWINGS

For a more complete understanding of the present invention, reference is made to the accompanying drawings in which.

DETAILED DESCRIPTION OF THE DRAWINGS

Figure 1:
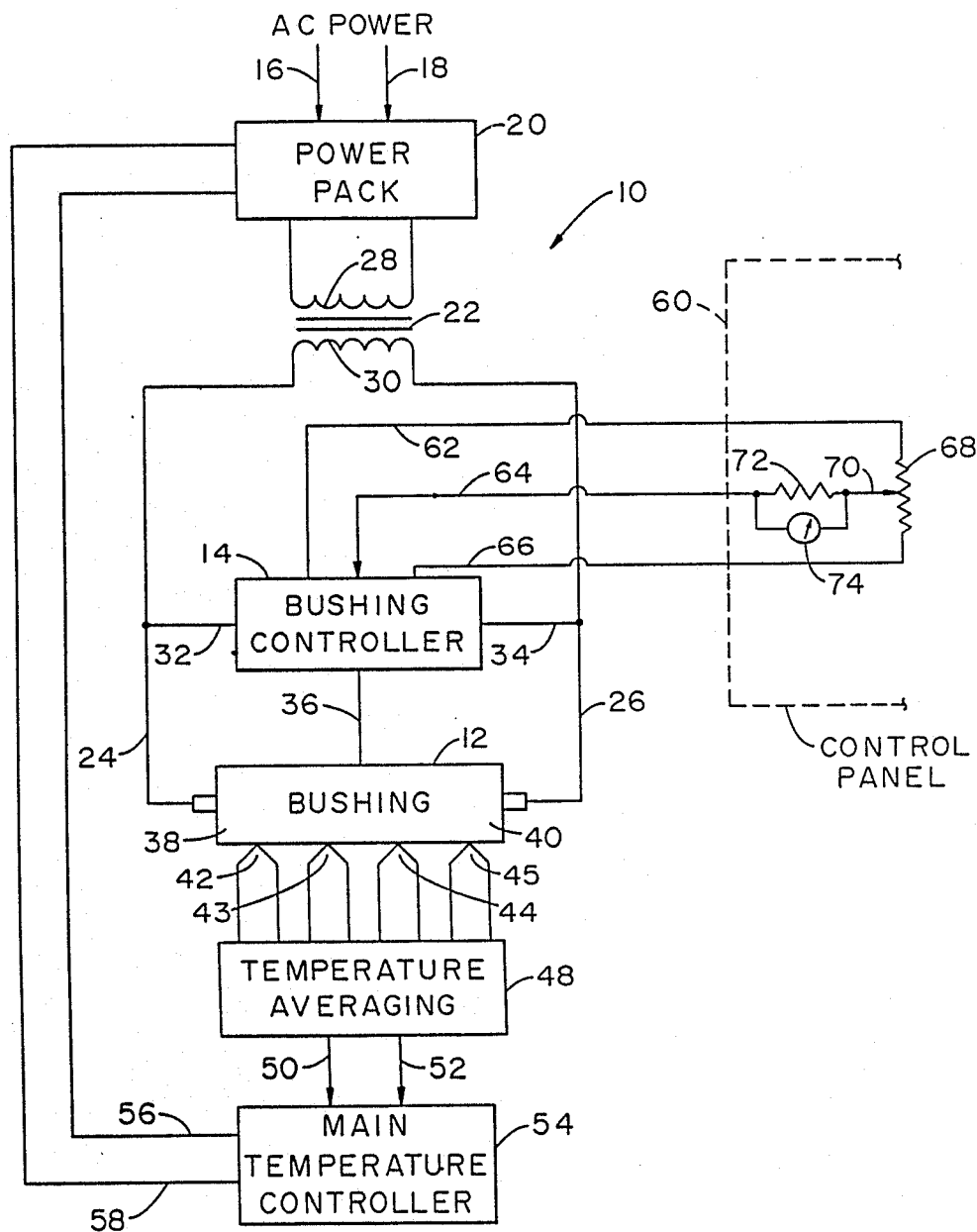
FIG. 1 is a schematic block diagram of a fiber glass bushing electrical heating system with its associated bushing and temperature controllers.

Turning to the drawings and FIG. 1 in particular, there is shown a power pack 20 having the AC lines 16 and 18 delivering current thereto. The power pack supplies AC power to the primary winding 28 of transformer 22, the secondary winding 30 of which is connected via lines 24 and 26 to a fiber glass bushing 12. Bushing 12 has connected across lines 24 and 26, in parallel with it, a bushing controller 14 which is operatively connected through lead lines 62, 64 and 66 to a control panel 60 in which is located a circuit which can be utilized to adjust electrical input to the bushing controller 14. The bushing 12 has a series of thermocouples 42, 43, 44 and 45 connected thereto at the sides thereof and near the bottom of the bushing 12. These thermocouples gather temperature information from the bushing 12 and passes that information to a temperature averaging device 48 which averages the temperatures measured by the thermocouples 42, 43, and 44 and 45. The average temperature is then converted to signals which are passed through lines 50 and 52 to a temperature controller 54 which then, through lead lines 56 and 58, passes those signals to power pack 20 to thereby regulate the current being passed to the transformer 22. The temperature measurements taken by thermocouples 42, 43, 44 and 45 are representative of the average temperature of a specific area of the orifice plate of the bushing 12. In recording these temperatures and producing signals in response thereto, it has been found that the bushing temperatures represented when taken at the sides near the bottom of the bushing result in not only a transmission of a signal representing the temperature measured in a given area of the bushing orifice plate but also the noise associated with those temperature readings. The average temperature arrived at in the temperature averaging device 48 therefore is an average temperature of not only the bushing orifice temperature but also the noise associated therewith. Experience has shown that this noise level can represent as much as 12% of signals generated by the thermocouples. Therefore, the signals being transmitted via lines 50 and 52 to the main temperature controller are inaccurate to the extent that they represent at least 12% noise utilizing a system such as described in U.S. Pat. No. 4,594,087. As will be appreciated, the control response to the bushing controller caused by variations in the power pack input generated by the main temperature controller 54 are consequently frequently inaccurate, especially during transient periods such as the start up of a bushing or the doffing of a forming package.

Figure 2:
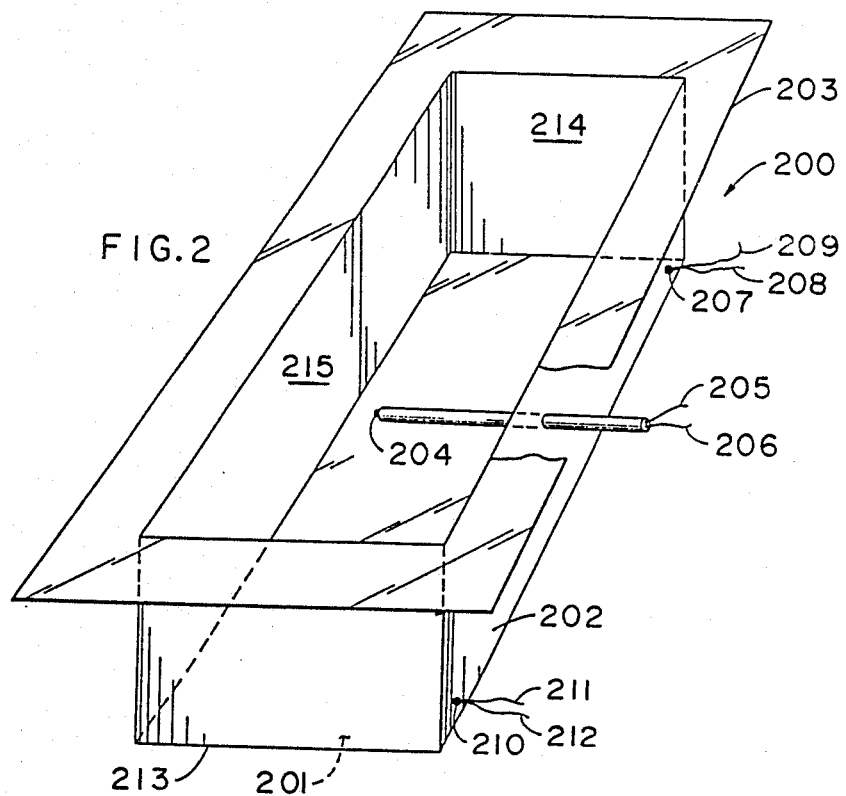
FIG. 2 is a diagrammatic illustration, in perspective, of one embodiment of the invention showing the placement of three thermocouples on a bushing.
Figure 3:
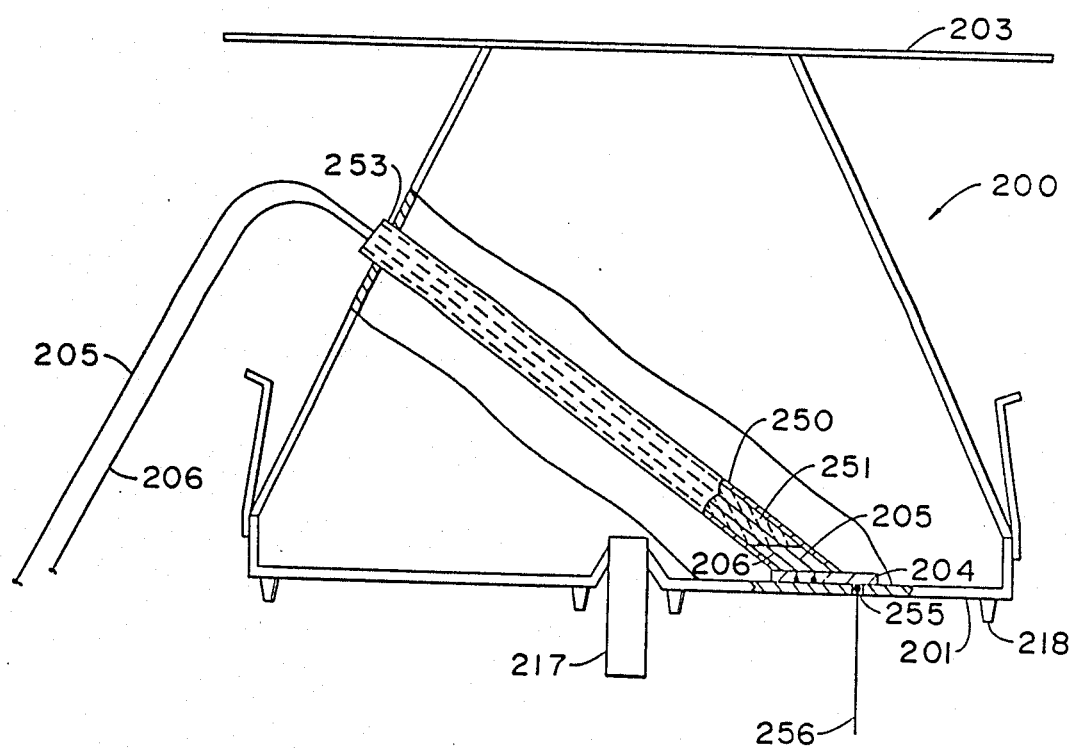
FIG. 3 is an end view of a fiber glass bushing showing the arrangement of the bottom thermocouple used in the embodiment of the instant invention in FIG. 2.

Turning to FIGS. 2 and 3, there is shown an illustration of one embodiment of apparatus constructed in accordance with the instant invention that can be used to provide the enhanced measurements and control contemplated by the method of controlling bushing temperatures herein described. Thus, as shown in FIG. 2, a bushing generally indicated at 200 has sidewalls 201 and 215, end walls 213 and 214 and a bottom or orifice plate 201. The orifices are not shown in this figure. The bushing 200 is open at the top and has a flange 203 around the walls and ends at the top for mounting the bushing within the ceramic bushing blocks conventionally employed in the art for mounting the bushing 200 to a forehearth. The bushing 200 is supplied with two thermocouples 207 and 210 which are located in the sidewall 202 of the bushing slightly above the bottom 201. Thermocouple 210 has two thermocouple leads 211 and 212 associated therewith and thermocouple 207 has thermocouple leads 209 and 208 associated therewith. Located in the center of the bushing on the orifice plate 201 is a third thermocouple 204 having lead lines 205 and 206 rising therefrom across the top of the bushing flange 203.

In FIG. 3, the bushing 200 of FIG. 2 is shown having a flange 203. The bushing is provided with side walls 202, 215 and 213 and a bushing bottom and plate 201. Plate 201 is provided with a plurality of orifice tips 218. Leads 205 and 206 of a thermocouple are shown entering the bushing in a tubular housing 250 through side wall 202 at opening 253. The thermocouple junction point is located in plate 204 to which tube 253 is attached. The thermocouples 205 and 206 are protected in the tube 250 by insulation 251 which surrounds them. The plate 204 is affixed to the bottom of the bushing through opening 255 in the bushing bottom 201 by the rod number 256. The electrical connection to the bushing is made through a lead 217.

Figure 4:
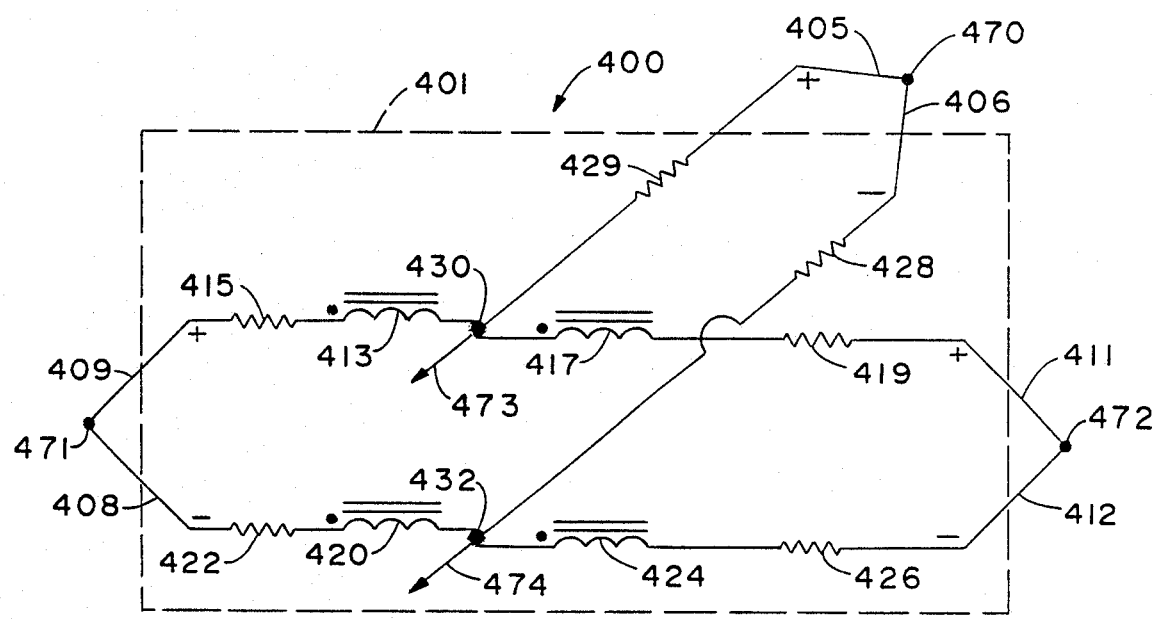
FIG. 4 is a circuit schematic of a transformer suitable for use in processing the invention.

In FIG. 4, which is a schematic of the invention, there is shown within the dotted line a depiction of the equivalent circuit of the transformer. The transformer generally indicated at 400 is comprised of four windings, 413, 417, 420 and 424, each winding having an associated direct current resistance, 415, 419, 422 and 426. The pairs of windings are identical in that the number of turns of winding 413 is the same as the number of turns of winding 420 and, similarly, the winding of 417 has the same number of turns as the winding of 424. The ratio of the turns of windings 413 and 420 to that of windings 417 and 424 are in the same relationship as the geometrical location of thermocouple 470 between thermocouples 471 and 472. The temperature at the location of thermocouple 471 causes a positive voltage to appear at lead 409 which then flows through winding 413 and its associated resistance 415 to node 430. In a similar manner the positive voltage from thermocouple 472 flows through its associated winding 417 and its resistance 419. The amount of signal that is weighted between each thermocouple is proportional to the conductance in each of the thermocouple arms. If a third thermocouple which is to be connected midway between thermocouples 471 and 472 is desired, then the turns of transformer windings 413, 417, 420 and 424 are made equal. It can be appreciated by those skilled in the art that by "filament winding" all four turns on the core, the leakage reactance can also be reduced which further enhances the signal to noise ratio. The positive lead 405 of the midpoint thermocouple 470 is then connected to node 430 through trimming resistor 429. If the value of the trimming resistor 429 equals the direct current resistance of windings 413, 415, then the average of the temperatures at all three thermocouples is achieved, provided similar ratios are provided in the negative legs via resistances 422, 426 and 428. If the total resistance 429 and 428 in the circuit associated with thermocouple 470 is equal to the total of the resistance (415, 422, 419 and 426) of the other two legs, then the signal appearing at nodes 430 and 432 which are connected to leads 473 and 474 respectively is comprised of 50 percent of the signal as measured by thermocouple 470 and 25 percent of the signals as measured by each of the thermocouples 471 and 472.

It can thus be appreciated that virtually any physical configuration can be affected by the proper choice of the number of turns of the coils on the transformer 413, 417, 420, 424, and the positioning of thermocouple circuit 470 with respect to the thermocouple circuits 471 and 472.

It has been found in accordance with this invention that certain conditions take precedent over others in determining the optimum location of a bottom thermocouple for measuring temperatures and avoiding the interference of noise. It is an important consideration in locating the bottom thermocouple that the thermocouple in relation to its position with respect to any other thermocouple used covers the X and Y axes of a bushing if the length and width are considered the X and Y axes respectively. Thus, looking at FIG. 2 it is found that those temperatures recorded by thermocouples 207 and 210 will approximately represent the temperature of the bushing area running towards the center and down and towards the back of the bushing in the two corners and somewhat toward the ends. By placing the thermocouple 204, however, in the center of the bushing inboard of the backwall 215, the remaining area of the bushing bottom is taken into consideration in the averaging of temperatures that occur in providing the transformer 400 output signal.

The effects of transients caused by deceleration of a winder, slow downs in filament draw speeds and their effects on the power requirement of the bushing bottom or the effect of start up, and increased air flows, followed by cooling of the bottom of the bushing and the signals resulting therefrom are largely measured by this novel system. Thus, a truer reflection of the actual temperature of the bushing bottom is obtained.

The Applicant has determined this by taking as many as 30 equidistant points of measurement on a tip plate to get a truer average of the tip plate temperatures when compared to temperature conventionally measured using sidewall thermocouples only. In analyzing these measurements, it has been determined that what is read through side wall thermocouples in a bushing is only 88% of the actual bushing tip plate temperature and the remaining 12% represents noise. By placing at least one of the thermocouples on the bottom of the bushing plate as shown herein where two thermocouples are used on the sides to measure the tip plate temperature, it has been found that this noise can be reduced significantly. The spacial relationship of thermocouples is normally placed on the bushings so that they span the X and Y axes as they are shown to do so in FIG. 2. It is important that at least 1 of the thermocouples utilized to measure the surface temperature of the bushing be away from the wall and that one be at least near a wall.

In general, any third thermocouple used in combination with side thermocouples will give a better representation of the average tip plate temperature than the side thermocouples do alone. It is within the contemplation of the instant invention that, in lieu of the thermocouple arrangement shown in FIG. 2, the thermocouples 210 and 207 rather than being located on the side could be located on the bottom of the bushing. In such a case, preferably one is located in the near corner at the bottom and the other in the far corner at the bottom. The important consideration is to have the thermocouples span the X and Y axes as stated heretofore.

While the bushings shown in the drawings have a generally rectangular configuration, it will also be understood by the skilled artisan that the same control can be applied to bushings of circular configuration. In such a case, the ideal situation would be to locate a thermocouple in the center of the circle and two on opposite sides along the diameter line. Modifications off the diameter would still be permitted provided that sufficient surface area of the circle was encompassed by the thermocouple locations. Thus, the important consideration is that the third signal responding thermocouple be placed with respect to the other two in such a manner that the noise effect of the measured temperatures normally recorded by the first two thermocouples is reduced to less than 6% of those measured temperatures.

While the invention has been described with reference to certain specific examples and illustrated embodiments it will be understood that it is not intended to be limited thereby except insofar as appears in the accompanying claims.

I claim:

1. Method of controlling the temperature of a fiber glass forming bushing wherein temperature of the bushing is measured at one location to produce a signal and the temperature of the bushing is measured at the second location to produce a second signal and wherein the first and second signals are combined and weight averaged to produce a signal representative of the average temperature of the bushing to produce a third signal which is fed to an electrical controller attached to the bushing to regulate the current feed to the bushing and consequently its temperature, the improvement comprising: feeding a first temperature-generated signal and a second temperature-generated signal to a transformer constructed and arranged to provide high impedance to common mode signals and low impedance to differential mode signals prior to sending a third signal to the bushing temperature controller.

2. Method of controlling the temperature of a fiber glass forming bushing wherein temperature of the bushing is measured at one location to produce a signal and the temperature of the bushing is measured at the second location to produce a second signal and wherein the first and second signals are combined and weight averaged to produce a signal representative of the average temperature of the bushing to produce a third signal which is fed to an electrical controller attached to the bushing to regulate the current feed to the bushing and consequently its temperature, the improvement comprising: feeding a first temperature-generated signal and a second temperature-generated signal to two inductor circuits constructed and arranged to provide high impedance to alternating current signals and low impedance to direct current signals fed thereto and feeding a third signal from the inductor circuits to the bushing temperature controller.

3. Method of controlling the temperature of a fiber glass forming bushing wherein temperature of the bushing is measured at one location to produce a signal and the temperature of the bushing is measured at the second location to produce a second signal and wherein the first and second signals are combined and weight averaged to produce a signal representative of the average temperature of the bushing to produce a third signal which is fed to an electrical controller attached to the bushing to regulate the current feed to the bushing and consequently its temperature, the improvement comprising: feeding the first temperature-generated signal and the second temperature-generated signal to two transformer circuits having a common core and each having a common connection between two windings connected so as to be series aiding, feeding a third temperature-generated signal from a position located at a third point on the bushing to the aforementioned common connection to which the first and second generated signals were fed in the transformer, weight averaging the three signals fed to the transformer to provide a fourth signal representative of the weight average temperature of the bushing and providing to a bushing controller while providing in the transformer high impedance to common mode signals and low impedance to differential mode signals to thereby protect the controller from improper operation caused by disconnection of any of the circuits producing the first, second or third temperature-generated signals.

4. A fiber glass forming bushing having positioned therein a thermocouple circuit attached to a sidewall of the bushing near the bottom thereof of one side, a second thermocouple position located on a bushing close to the bottom at a point close to or at the bottom thereof on the same side of the bushing at an opposing end of said side and a third thermocouple positioned on the bottom of the bushing close to a side wall of the bushing and at a point remote from the first and second thermocouple positions, means to pass signals generated by the thermocouples to a transformer having a common core and two circuit windings wound around the core, both circuits being equal in resistance and connected series aiding, and having null points in the center thereof to which the output of the bottom thermocouple is attached, resistance means in the three circuits to weight average the signals fed to the transformer and convert them to an average signal, and means to feed that signal to a bushing temperature controller to thereby regulate the temperature of the bushing while preventing any common mode signals from passing through the transformer but permitting, by virtue of its low impedance, the differential mode signals to pass freely through the transformer.

* * * * *

UNITED STATES PATENT AND TRADEMARK OFFICE
CERTIFICATE OF CORRECTION

PATENT NO. : 4,794,625
DATED : December 27, 1988
INVENTOR(S) : Reed H. Grundy

It is certified that error appears in the above-identified patent and that said Letters Patent is hereby corrected as shown below:

On the cover page of the patent in the "References Cited" section, the following patents should be included:

| | | | |
|---|---|---|---|
| 4,546,485 | 10/85 | Griffiths et al | 373/28 |
| 4,594,087 | 6/86 | Kuhn | 65/1 |
| 4,738,700 | 4/88 | Grundy | 65/1 |
| 4,746,344 | 5/88 | Kuhn | 65/1 |

Signed and Sealed this

Second Day of April, 1991

Attest:

HARRY F. MANBECK, JR.

*Attesting Officer*  *Commissioner of Patents and Trademarks*